`US011081761B2`

(12) United States Patent
Delaporte et al.

(10) Patent No.: US 11,081,761 B2
(45) Date of Patent: Aug. 3, 2021

(54) FLEXIBLE ELECTRODE-SEPARATOR ELEMENTS AND PROCESSES FOR THEIR PREPARATION

(71) Applicants: HYDRO-QUÉBEC, Montréal (CA); Transfert Plus, S.E.C., Montréal (CA)

(72) Inventors: Nicolas Delaporte, Montréal (CA); Diby Benjamin Ossonon, Montréal (CA); Karim Zaghib, Longueuil (CA); Daniel Belanger, Saint-Hubert (CA)

(73) Assignees: HYDRO-QUÉBEC, Montreal (CA); TRANSFERT PLUS, S.E.C., Montreal (CA)

(*) Notice: Subject to any disclaimer, the term of this patent is extended or adjusted under 35 U.S.C. 154(b) by 236 days.

(21) Appl. No.: 16/318,878

(22) PCT Filed: Jul. 21, 2017

(86) PCT No.: PCT/CA2017/050881
§ 371 (c)(1),
(2) Date: Jan. 18, 2019

(87) PCT Pub. No.: WO2018/014137
PCT Pub. Date: Jan. 25, 2018

(65) Prior Publication Data
US 2019/0288260 A1    Sep. 19, 2019

Related U.S. Application Data

(60) Provisional application No. 62/365,450, filed on Jul. 22, 2016.

(51) Int. Cl.
*H01M 50/46* (2021.01)
*H01M 4/04* (2006.01)
(Continued)

(52) U.S. Cl.
CPC ......... *H01M 50/46* (2021.01); *H01M 4/0402* (2013.01); *H01M 4/13* (2013.01);
(Continued)

(58) Field of Classification Search
None
See application file for complete search history.

(56) References Cited

U.S. PATENT DOCUMENTS

2011/0159372 A1    6/2011    Zhamu et al.
2012/0115049 A1    5/2012    Rinzler et al.
(Continued)

FOREIGN PATENT DOCUMENTS

CA    2803772 A1    12/2011
CN    104103791 A    10/2014
(Continued)

OTHER PUBLICATIONS

Daniel, C. et al."Prospects for reducing the processing cost of lithium ion batteries" Journal of Power Sources, vol. 275, 2015, pp. 234-242.
(Continued)

*Primary Examiner* — Wyatt P McConnell
(74) *Attorney, Agent, or Firm* — Buchanan Ingersoll & Rooney P.C.

(57) ABSTRACT

This application describes a process for the preparation of flexible electrode-separator elements or assemblies, which includes the application of an electrode material on the separator. The electrode material comprises graphene, for instance produced by graphite exfoliation. The electrode-separator elements obtained by the process as well as their use in electrochemical cells are also described.

26 Claims, 11 Drawing Sheets

(51) Int. Cl.
| | |
|---|---|
| H01M 4/62 | (2006.01) |
| H01M 10/0525 | (2010.01) |
| H01M 4/13 | (2010.01) |
| H01M 4/1391 | (2010.01) |
| H01M 4/139 | (2010.01) |
| H01M 4/1397 | (2010.01) |
| H01M 50/403 | (2021.01) |
| H01M 50/411 | (2021.01) |
| H01M 10/052 | (2010.01) |
| H01M 4/131 | (2010.01) |
| H01M 4/136 | (2010.01) |

(52) U.S. Cl.
CPC ......... *H01M 4/139* (2013.01); *H01M 4/1391* (2013.01); *H01M 4/1397* (2013.01); *H01M 4/625* (2013.01); *H01M 10/0525* (2013.01); *H01M 50/403* (2021.01); *H01M 50/411* (2021.01); *H01M 4/131* (2013.01); *H01M 4/136* (2013.01); *H01M 10/052* (2013.01); *H01M 2220/20* (2013.01); *Y02E 60/10* (2013.01)

(56) References Cited

U.S. PATENT DOCUMENTS

| | | |
|---|---|---|
| 2013/0102084 A1 | 4/2013 | Loh et al. |
| 2016/0133916 A1* | 5/2016 | Zagars .............. H01M 10/0585 429/152 |

FOREIGN PATENT DOCUMENTS

| | | |
|---|---|---|
| CN | 104916809 A | 9/2015 |
| WO | 2011079238 A1 | 6/2011 |

OTHER PUBLICATIONS

Ohzuku, T. et al."Zero-Strain Insertion Material of Li[Li1/3Ti5/3]O4 for Rechargeable Lithium Cells" J. Electrochem. Soc., vol. 142, No. 5, May 1995. pp. 1431-1435.
Zaghib, K. et al."Electrochemistry of Anodes in Solid-State Li-Ion Polymer Batteries"J. Electrochem. Soc., vol. 145, No. 9, Sep. 1998, pp. 3135-3140.
Zaghib. K. et al."Electrochemical and thermal characterization of lithium titanate spinel anode in C-LiFePO4//C-Li4Ti5O12 cells at sub-zero temperatures" Journal of Power Sources, vol. 248, 2014, pp. 1050-1057.
Doi, T. et al."Electrochemical Insertion and Extraction of Lithium Ion at Uniform Nanosized Li4/3Ti5/3O4 Particles Prepared by a Spray Pyrolysis Method"Chem. Mater. 2005, vol. 17, pp. 1580-1582.
Praneetha, S. et al."A rapid, one-pot microwave-solvothermal synthesis of a hierarchical nanostructured graphene/LiFePO4 hybrid as a high performance cathode for lithium ion batteries" RSC Advances, vol. 3, 2013, pp. 25403-25409.
Delaporte, N. et al."Increasing the Affinity Between Carbon-Coated LiFePO4/C Electrodes and Conventional Organic Electrolyte by Spontaneous Grafting of a Benzene-Trifluoromethylsulfonimide Moiety" ACS Appl. Mater. Interfaces, 2015, vol. 7, pp. 18519-18529.
Zaghib, K, et al."Electrochemical study of Li4Ti5O12 as negative electrode for Li-ion polymer rechargeable batteries" Elsevier, Journal of Power Sources, vol. 81-82, 1999, pp. 300-305.
Colbow, K.M. et al."Structure and Electrochemistry of the Spinel Oxides LiTi2O4 and Li4/3Ti5/3O4" Journal of Power Sources, vol. 26, 1989, pp. 397-402.
Wu, Z. et al."Binder-freeactivatedgraphenecompact films forall—solid-state micro-supercapacitors with high areal and volumetric capacitances" EnergyStorageMaterials, vol. 1, 2015, pp. 119-126.
Extended European Search Report dated May 8, 2020, issued by the European Patent Office in corresponding European Application No. 17830160.2-1108, (17 pages).
Gratz, E. et al., "A closed loop process for recycling spent lithium ion batteries", Journal of Power Sources, 262, pp. 255-262, 2014.
International Search Report (PCT/ISA/210) dated Oct. 11, 2017, by the Canadian Patent Office as the International Searching Authority for International Application No. PCT/CA2017/050881.
International Search Report (PCT/ISA/210) dated Sep. 25, 2017, by the Office de la propriete intellectuelle du Canada as the International Searching Authority for International Application No. PCT/CA2017/050880.
Li et al., "Flexible graphene-based lithium ion batteries with ultrafast charge and discharge rates", vol. 109, No. 43, Proceedings of the National Academy of Sciences of the United States Of America, Sep. 17, 2012, pp. 17360-17365.
Tanong, K. et al., "Metal Recycling Technologies for Battery Waste", Recent Patents on Engineering, 2014, 8, 13-23.
Written Opinion (PCT/ISA/237) dated Oct. 11, 2017, by the Canadian Patent Office as the International Searching Authority for International Application No. PCT/CA2017/050881.
Written Opinion (PCT/ISA/237) dated Sep. 25, 2017, by the Office de la propriete intellectuelle du Canada as the International Searching Authority for International Application No. PCT/CA2017/050880.
Zhang, X. et al., "Preparing graphene from anode graphite of spent lithium-ion batteries", Front. Environ. Sci. Eng. 2017, 11(5): 6.
Zhou et al., "A flexible sulfur-graphene-polypropylene separator integrated electrode for advanced Li-S batteries", Adv. Mater. Jan. 27, 2015, pp. 641-647.

* cited by examiner

FLEXIBLE ELECTRODE-SEPARATOR ELEMENTS AND PROCESSES FOR THEIR PREPARATION

RELATED APPLICATION

The present application claims priority under applicable law to U.S. provisional application No. 62/365,450 filed on Jul. 22, 2016, the content of which is incorporated herein by reference in its entirety and for all purposes.

TECHNICAL FIELD

The technical field generally relates to electrodes and processes for their preparation, for example, to electrode-separator type flexible elements using graphene as a carbon source and as binder. The present document also describes the use of flexible electrode-separator elements in electrochemical cells, for example, lithium-ion batteries.

BACKGROUND

Conventional processes for preparing electrodes generally require, for example, the use of resistive and costly binders (e.g., PVDF) as well as toxic and expensive solvents, such as N-methyl-2-pyrrolidone (NMP). These methods include numerous steps, i.e., milling, mixing of the components (conductive additive, binder, anode/cathode material), preparation of a suspension, coating of the suspension, solvent elimination, etc., which greatly increase the time required to manufacture the electrode. In addition, aluminum current collectors are generally used, which limit the energy density of the electrode since the aluminum current collector represents by itself nearly 50% of the total weight of the electrode. As an example, for a LiFePO$_4$/C (LFP) electrode, with a loading of 3.6 mg/cm$^2$, the aluminum current collector represents 47% of the electrode's weight. This percentage dramatically increases for thinner electrodes.

As reported recently (Daniel et al., *J. Power Sources*, 2015, 275, 234-242), great efforts have been devoted to the reduction of Li-ion batteries' processing costs. According to the cost modeling presented in Daniel et al., 50% of a Li-ion battery's price comes from the composite electrode materials and current collectors. It has also been shown that the PVDF dispersion's costs are estimated at $18.9-23.1/kg versus $0.5-1.4/kg for CMC. In addition to the graphite electrode, widely used as anode in commercialized Li-ion batteries, Li$_4$Ti$_5$O$_{12}$ (LTO) is of interest for an application in Li-ion batteries (Ohzuku et al., *J. Electrochem. Soc.*, 1995, 142, 1431-1435; Zaghib et al., *J. Electrochem. Soc.*, 1998, 145, 3135-3140). The main advantage of Li$_4$Ti$_5$O$_{12}$ is that a Solid Electrolyte Interphase (SEI) layer does not form at its surface upon cycling due to its high working potential of 1.55 V versus Li/Li$^+$. Moreover, this electrode material is very stable during lithium insertion and is known to be a zero-strain material (Zaghib et al., *J. Power Sources*, 2014, 248, 1050-1057). This material could be used to manufacture batteries eventually used in applications, for example, in smart devices. However, similarly to LiFePO$_4$, the electrochemical performance of LTO anodes is limited by its low electronic conductivity. Therefore, high rate applications would require that LTO particles be coated with a thin carbon layer (Doi et al., *Chem. Mater.*, 2005, 17, 1580-1582).

There is therefore a need for decreasing the necessary time and/or manufacturing costs for the preparation of Li-ion batteries. There is also a need for electrodes having an increased energy density and/or efficiency. Finally, there is a need for greener processes, in order to limit the use of toxic solvents or high temperature and pressure conditions.

SUMMARY

According to a first aspect, the present technology comprises a process for the manufacture of a flexible electrode-separator element composed of an electrode material comprising graphene and a separator, the process including the steps of:

a) mixing a graphene powder, and optionally an electrochemically active material, with a solvent to form a suspension;

b) applying the suspension obtained in (a) on a separator to obtain an electrode material layer on a surface of the separator; and c) removing the solvent to obtain the electrode-separator element.

According to one embodiment, step (b) comprises coating the suspension on the separator, for example, using the doctor blade method. In one embodiment, the process is carried out in a continuous manner (for example, from roll to roll). In another embodiment, steps (b) and (c) comprise the steps of filtering the suspension obtained in (a) through the separator to obtain an electrode material layer on a surface of the separator, which is optionally dried, to obtain the electrode-separator element. In one embodiment, the suspension comprises an electrochemically active material. For example, the electrochemically active material is selected from TiO$_2$, Li$_2$TiO$_3$, Li$_4$Ti$_5$O$_{12}$, H$_2$Ti$_5$O$_{11}$ and H$_2$Ti$_4$O$_9$, or a combination thereof, LiM'PO$_4$, wherein M' is Fe, Ni, Mn, Co, or a combination thereof, LiV$_3$O$_8$, V$_2$O$_5$, LiMn$_2$O$_4$, LiM"O$_2$, wherein M" is Mn, Co, Ni, or a combination thereof, Li(NiM''')O$_2$, wherein M''' is Mn, Co, Al, Fe, Cr, Ti, or Zr, and combinations thereof. In another embodiment, the electrochemically active material is a lithium titanate or a lithium metal phosphate. For example, the electrochemically active material is Li$_4$Ti$_5$O$_{12}$, LiFePO$_4$, or carbon-coated LiFePO$_4$.

In one embodiment, the graphene powder is obtained by exfoliation, for example, by chemical or electrochemical exfoliation, of a graphite foil. For example, the electrode material comprises at least 10%, or from about 10% to about 30%, or from about 15% to about 20%, or about 20% by weight of graphene.

In another embodiment, the solvent is selected from N,N-dimethylformamide, water, an alcohol and mixtures thereof. The step of mixing in the present process may further include treating the suspension in an ultrasonic bath.

In a further embodiment, the separator is a polymer separator, for example, comprising at least one layer of polypropylene, of polyethylene or a combination thereof. The separator may also be multilayer (such as bilayer or trilayer). One example of a polymer separator is a polypropylene/polyethylene/polypropylene-type trilayer separator, or a Celgard® type separator.

In yet another embodiment, the process includes a drying step, wherein said drying is performed at a temperature of at least 50° C., or a temperature of at most 160° C. or at most 120° C., or at a temperature within the range of from 50° C. to 80° C., for example, at a temperature of about 60° C. In one embodiment, the drying step is performed under vacuum.

In another aspect, the present technology includes a flexible electrode-separator element produced by a process as herein defined, and an electrochemical cell including such a flexible electrode-separator element, a liquid or gel electrolyte, and a counter-electrode. In one embodiment, the electrochemical cell comprises an anode, a cathode, and a liquid or gel electrolyte, wherein each of the anode and the cathode is a flexible electrode-separator element as herein defined. In yet another embodiment, the present technology relates to the use of electrochemical cells as herein defined in electrical or hybrid vehicles, or in IT devices such as smart devices or laptop computers.

DETAILED DESCRIPTION

Figure 1:
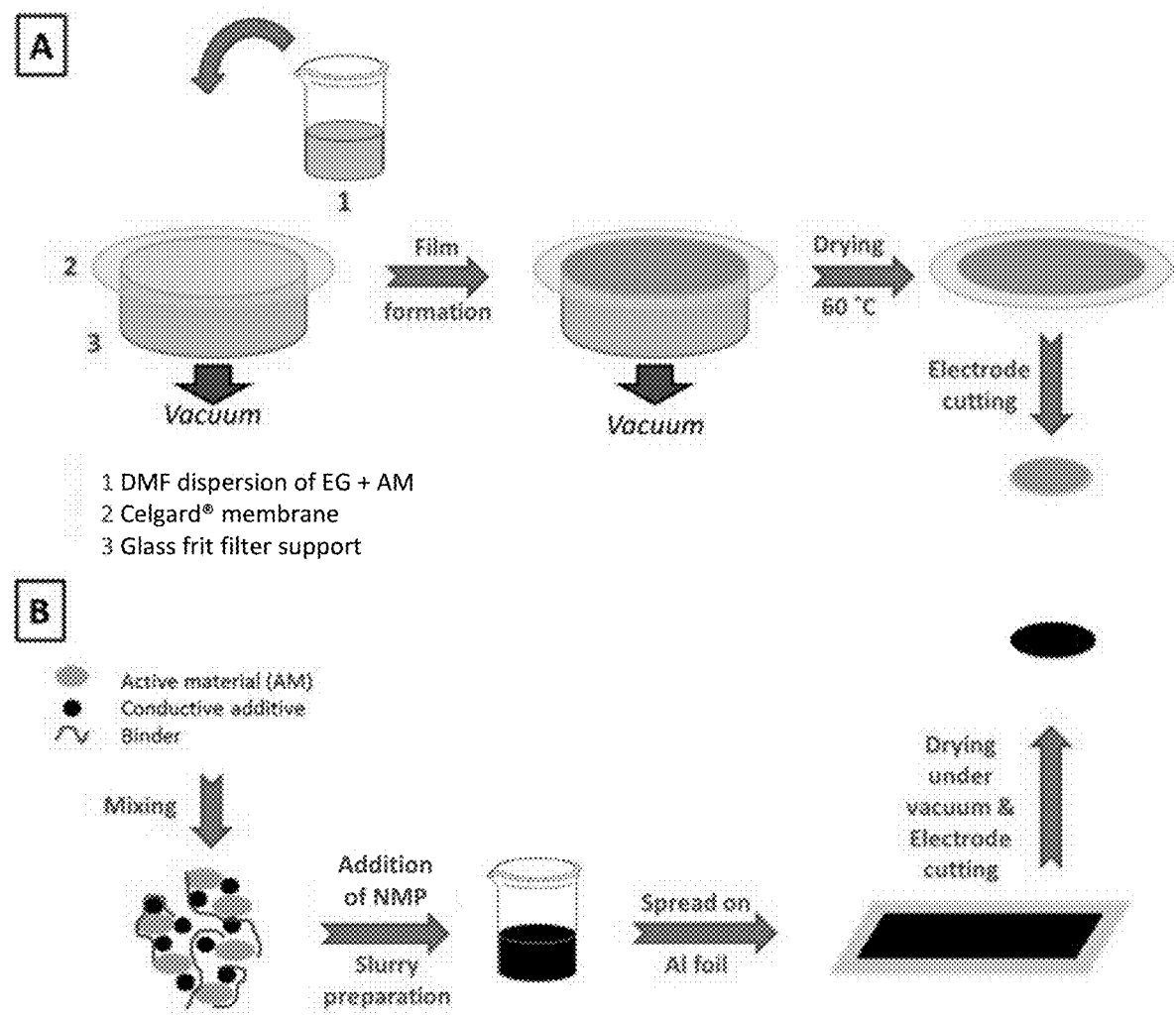
FIG. 1 is a schematic illustration of the preparation steps of Li-ion electrodes using a) the process according to an embodiment of the present application, and b) a conventional process.

In this document, the term "about" when followed by a reported measurement or value means within the acceptable limits of the experimental error as determined by the person skilled in the art, which will depend in part on how the value is measured or calculated, i.e. according to the limits of the measuring equipment. This value will also take into account the number of significant digits expressed and the rounding of the values. In the alternative, unless otherwise indicated, when the term "about" is used in the present description or claims, it means that a margin of error must be assumed, for example more or less 10%, or more or less 5%, or more or less 1%, of the described value.

According to one aspect, the present technology relates to a process for producing a flexible electrode-separator element or assembly comprising an electrode material on a separator. The electrode material is on a surface of the separator and no current collector is required on the other side of the electrode material (self-standing electrode).

In one embodiment, the electrode material comprises a graphene powder. Preferably, the graphene powder is produced by exfoliation, for example, by chemical or electrochemical exfoliation of a graphite foil. The exfoliated graphene powder obtained allows for a good flexibility of the electrode-separator element. For example, the graphene powder is produced by electrochemical exfoliation of a graphite foil, wherein the graphite foil serves as anode (connected to the positive terminal of a power supply), and the cathode is, for example, platinum (e.g., platinum mesh). The electrochemical exfoliation proceeds by electrolysis as both electrodes are immersed in a sulfuric acid electrolyte solution and a DC voltage is applied (for example, a voltage between 4 and 10V, limits included) between the two electrodes. Electrolysis is carried out for a period of at least 30 minutes, for instance between 45 minutes and 1.5 hours. The graphene sheets are then recovered (for example, by filtration) and dispersed in a solvent by ultrasonication and left standing for graphite flakes to precipitate. The upper part of the dispersion is then collected and thermally treated under a hydrogen-containing atmosphere such as a mixture of hydrogen and an inert gas (e.g., 5% H$_2$ in argon). The thermal treatment is performed at a temperature above 700° C., for example between 800° C. and 1200° C., or about 1000° C.

In another embodiment, the electrode material further comprises an electrochemically active material such as an oxide, a complex oxide, a phosphate, or a silicate. In one embodiment, the electrochemically active material comprises a material selected from the group consisting of titanates, lithium titanates, metal phosphates, lithium metal phosphates, vanadium oxides, lithium metal oxides, and combinations thereof. For example, the electrochemically active material may be selected from TiO$_2$, Li$_2$TiO$_3$, Li$_4$Ti$_5$O$_{12}$, H$_2$Ti$_5$O$_{11}$ and H$_2$Ti$_4$O$_9$, or a combination thereof, LiM'PO$_4$ wherein M' is Fe, Ni, Mn, Co, or a combination thereof, LiV$_3$O, V$_2$O$_8$, LiMn$_2$O$_4$, LiM"O$_2$, wherein M" is Mn, Co, Ni, or a combination thereof, Li(NiM''')O$_2$, wherein M''' is Mn, Co, Al, Fe, Cr, Ti, or Zr, and combinations thereof. In one embodiment, the electrochemically active material is selected from lithium titanates and lithium metal phosphates, for example, Li$_4$Ti$_5$O$_{12}$, or LiFePO$_4$. In one embodiment, the electrochemically active material is carbon coated. For example, the electrochemically active material comprises carbon-coated lithium metal phosphate particles, such as carbon-coated LiFePO$_4$ (referred to as LiFePO$_4$/C hereinafter).

In one embodiment, the polymer separator is a microporous polymer separator such as a Celgard® separator. The polymer separator may be a monolayer or a multilayer separator comprising any material known to be compatible for use as a membrane type separator in the production of liquid electrolyte or gel electrolyte batteries. The separator must be selected for its compatibility with the conditions used in the preparation of the electrode-separator element, for example, solvent, temperature, particle size, etc. The selected separator will also depend on the scale and method of manufacture, for example, an industrial setting using conditions such as those used in paper processes (e.g., using a continuous roll-to-roll type of equipment). In such examples, temperature and mechanical resistance conditions must be taken into consideration. Non-limiting examples of separators used in the preparation of batteries include inorganic, organic or naturally occurring materials, for example, one or more of non-woven fibers (e.g., cotton, nylon, polyesters, glass), polymer films (e.g., polyethylene, polypropylene, poly(tetrafluoroethylene), polyvinyl chloride), and naturally occurring substances (e.g., rubber, asbestos, wood). Preferably, the separator is a polymer separator comprising at least one layer of polypropylene (PP), polyethylene (PE) or a combination thereof. The separator may also comprise multiple layers of PE, PP or a combination, for instance, a PP/PE/PP triple layer polymer separator.

In another embodiment, the graphene powder represents at least 10 wt. % of the electrode material's total weight Below 10 wt. %, the amount of graphene may not be sufficient to allow good flexibility which could involve a degradation of the electrode material under mechanical stress. For example, the electrode material may comprise from about 10 wt. % to about 30 wt. %, or from about 15 wt. % to about 20 wt. % of graphene.

In one embodiment, the process comprises a step of mixing the graphene powder, and optionally an electrochemically active material, with an aqueous or non-aqueous solvent to form a suspension. The solvent may be any aqueous or non-aqueous solvent, known to the person skilled in the art and compatible with the separator and active materials, including graphene and the electrochemically active material if present. Non-limiting examples of solvents include N,N-dimethylformamide (DMF), water, an alcohol such as methanol, or a combination thereof.

In one embodiment, the process comprises the steps of applying the suspension on the separator and removing the solvent. For example, the application includes coating the suspension on the separator by a method such as extrusion, back coating, knife-over-roll, doctor blade, slot-die, or any other similar method. In one embodiment, the process is carried out in a continuous manner (for example, roll-to-roll) in an industrial setting.

In another embodiment, the application comprises a step of filtering the electrode suspension using the separator as a filtration membrane. The suspension is applied on the separator thereby forming a layer of electrode material on one of its surfaces.

In one embodiment, the suspension is treated in an ultrasonic bath for a period of time of at least 10 minutes prior to its application on or its filtration through the separator. For example, the suspension is treated in an ultrasonic bath for about 10 to about 30 minutes, preferably about 20 minutes. In one embodiment, the filtration of the through the separator membrane is carried out under vacuum, using a Büchner-type assembly or any other membrane filtration device known to the person skilled in the art. In one embodiment, a mixture comprising the solvent (such as DMF), graphene and electrochemically active material is vacuum filtered until a homogeneous film is formed on the filter, i.e., on the separator, which may be a polymer separator such as a Celgard® membrane.

In one embodiment, the process further comprises a step of drying the electrode-separator element. In one embodiment, the drying step is carried out in an oven, for instance under reduced pressure, or any other drying techniques known to the person skilled in the art. In one embodiment, the drying temperature is of at least 50° C. For instance, the temperature may be between 50° C. and 80° C., preferably around 60° C. Preferably, the oven is under vacuum in order to improve the drying process. In another embodiment, the drying temperature is below 160° C. or below 120° C. For example, the temperature may be comprised between 50° C. and 160° C., or between 50° C. and 120° C., or between 80° C. and 160° C., or between 80° C. and 120° C.

According to another aspect, this technology also relates to a flexible electrode-separator element produced by the process described herein. The flexible electrode-separator element includes a separator having two opposite surfaces. An electrode material layer, which includes graphene or a mixture of graphene and electrochemically active material, is present on one of the surfaces of the separator to form the electrode, for example, a self-standing electrode. In one embodiment, the electrode material layer is an ultra-thin self-standing layer comprising graphene, which also acts as current collector.

The electrode-separator element may be an anode-separator or a cathode-separator element. An example of an anode-separator element includes a mixture of graphene and of an electrochemically active anode material (such as $Li_4Ti_5O_{12}$) filtered on a polymer separator, thereby forming a layer on a surface of the polymer separator. The graphene and electrochemically active anode material layer standing on the surface of the polymer separator acts as the anode. An example of a cathode-separator element includes a mixture of graphene and an electrochemically active cathode material (such as $LiFePO_4$ or carbon-coated $LiFePO_4$) filtered on a polymer separator, thereby forming a layer on a surface of the polymer separator. The graphene and electrochemically active cathode material layer standing on the surface of the polymer separator then acts as the cathode.

A flexible metal grid or printed conducting film may also be used on the surface of the electrode material opposing the separator in replacement of a current collector and without further binder addition.

According to another aspect, this technology relates to an electrochemical cell including a flexible electrode-separator element as defined herein. The electrochemical cell is produced using a flexible electrode-separator element, a liquid or gel electrolyte, and a counter-electrode. The counter-electrode is applied on the opposite surface of the separator. The term "counter-electrode" is generally used in the present technology to designate an electrode of opposite polarity to the graphene-containing electrode. For example, where the graphene-containing electrode is an anode, then the counter-electrode a cathode. Similarly, when the graphene-containing electrode is the cathode, then the counter-electrode is an anode. In one embodiment, the electrochemical cell may comprise an electrode-separator element as a cathode-separator and a lithium film as the anode. In another embodiment, the electrochemical cell comprises an anode and a cathode, both of which are electrode-separator elements such as those described herein, where the free surface of each separator faces the free surface of the other, and a liquid or gel electrolyte is added to impregnate the separators.

EXAMPLES

The following non-limiting examples are illustrative and should not be construed as limiting the scope of the present invention. These examples will be better understood with reference to the accompanying figures.

Example 1—Preparation of Electrodes and Electrochemical Cells a) Electrochemical Exfoliation of Graphite Foil Graphene powder was obtained by electrochemical exfoliation of a graphite foil (Alfa Aesar, 7.5 cm×2 cm×0.05 cm) (see Canadian Patent Application No. 2,803,772, National University of Singapore). More specifically, this graphite foil is used as anode (connected to the positive terminal of a DC power supply) and the counter-electrode is a platinum mesh (4 cm$^2$). Both the graphite foil and counter electrode are immersed in a 0.1 M H$_2$SO$_4$ electrolytic solution and are separated by a constant distance of 4 cm. The electrochemical exfoliation was carried out by applying a DC voltage of 4, 6, 8 or 10 V between the two electrodes. After about 1 hour of electrolysis, the solution containing exfoliated graphene sheets was filtered under vacuum using a Büchner assembly and a polytetrafluoroethylene (PTFE) membrane filter with a pore size of 0.47 μm. The resulting exfoliated graphene powder, denoted EG in the Figures of the present document, was then washed several times with Nanopure water to remove residual acid before being dispersed in N,N-dimethylformamide (DMF) by ultrasonication for 10 minutes. The dispersion was left to rest for 24 hours when some thick graphitic flakes precipitated. Only the upper part of the dispersion was collected. The resulting material was treated for 1 hour at 1000° C. under 5% hydrogenated argon and subsequently used in the manufacture of anodes and cathodes as described below.

b) Preparation of Flexible Electrode-Separator Element

Figure 2:
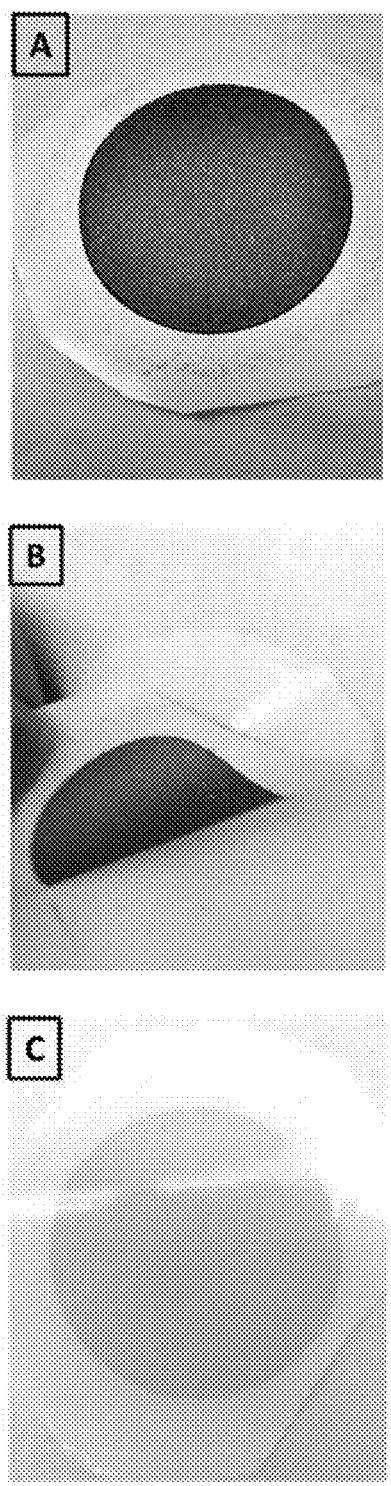
FIG. 2 shows photographs of a flexible LFP electrode-separator element according to one embodiment and showing a) the top part (electrode material); b) both top and bottom parts (folded flexible electrode); and c) the bottom part (membrane of the battery separator) of the electrode.

According to the method described herein and illustrated in FIG. 1a, 80 wt. % of electrochemically active material (LiFePO$_4$/C or Li$_4$Ti$_5$O$_{12}$ powder) was dispersed in 50 mL of DMF (or water) followed by the addition of 20 wt. % of the exfoliated graphene powder produced in (a). Additional experiments were also carried out using 85% by weight of LiFePO$_4$/C. The solution is then treated in an ultrasonic bath for 20 minutes. The mixture of graphene and electrochemically active material was filtered with a Büchner assembly using a Celgard®-2320 separator as filter. After half an hour, a layer comprising a graphene and electrochemically active material mixture formed on the separator and was left to rest for one hour before being dried in an oven at 60° C. under vacuum. After drying, the electrode-separator element was cut into a circular disk. These electrode-separator elements were denoted LFPcelgard and LTOcelgard electrodes. FIG. 2 shows an example of a thin and homogeneous LFPcelgard electrode with a Celgard®-2320 separator. As can be seen in FIG. 2b, the electrode is totally flexible without any degradation of the film, which remains intact under mechanical stress.

c) Preparation of an Electrode on Aluminum Foil (Comparative)

LiFePO$_4$/C (2-3 wt. % of carbon) and Li$_4$Ti$_5$O$_{12}$ were provided by Hydro-Quebec, Montréal, Canada. The conventional manufacture method (see FIG. 1b) was used and consisted in mixing the electrochemically active material with a conductive additive and a binder in a small amount of solvent to obtain a suspension. In this case, the electrochemically active material (LiFePO$_4$/C or Li$_4$Ti$_5$O$_{12}$ powder) is mixed with polyvinylidenedifluoride (PVDF) and conductive acetylene black in a weight ratio of 80:10:10, NMP (Alfa Aesar, 99%) being used as solvent. The resulting suspension was then cast on an aluminum foil having a thickness of 15 μm. Layers with thicknesses of 50, 85, 185 or 235 μm were formed. The aluminum foil including the electrode material layer was then dried at 80° C. under vacuum for 24 hours. These electrodes are denoted LFPalu and LTOalu electrodes. The electrode thus obtained is then cut into a circular disk.

d) Preparation of Electrochemical Cells

The conventional LFPalu and LTOalu electrodes were assembled and tested in two-electrode electrochemical coin cells with a metallic lithium counter-electrode, a Celgard®-2320 separator, and a LiPF$_6$ (1M) solution in an ethylene carbonate (EC)/diethyl carbonate (DEC)/dimethyl carbonate (DMC) mixture (in a volume ratio of 1:1:1) as electrolyte. Since the LFPcelgard and LTOcelgard electrodes already include a Celgard®-2320 membrane separator, no additional Celgard®-2320 was used for cells comprising theses electrodes. The cells were assembled in a dry argon-filled glove-box.

Example 2—Characterization of the Electrodes by Scanning Electron Microscopy Characterization by scanning electron microscopy (SEM) of the surface morphology of the electrodes deposited on the separator was performed to verify the good distribution of the electrochemically active material and graphene in the film as well as to prove that the film remained intact, without any dissolution after cycling in a battery.

Morphological studies were performed with a JEOL JSM-7600F scanning electron microscope equipped with an Oxford Instruments X-Max 80 EDS detector.

Figure 3:
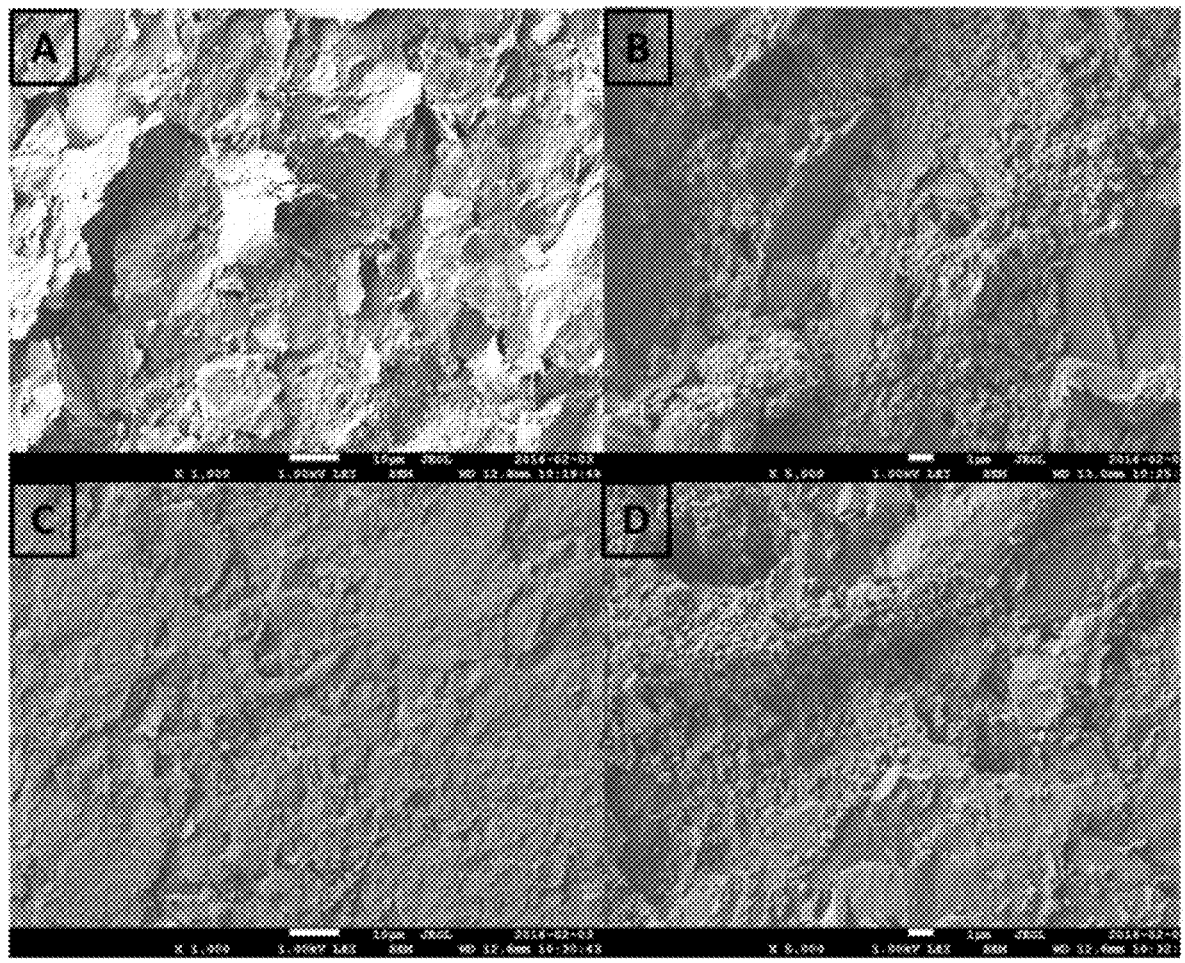
FIG. 3 shows Scanning Electron Microscopy (SEM) images of the electrode material of an LFPcelgard electrode element according to one embodiment, a) before cycling (image obtained at 1000×); b) before cycling (image obtained at 5000×); c) after cycling (image obtained at 1000×); and d) after cycling (image obtained at 5000×).

FIG. 3 presents the SEM images of the LFPcelgard electrode before (a and b) and after (c and d) cycling. At low magnification (FIG. 3a), the surface of the film is composed of small LiFePO$_4$/C particles ranging from several hundred nanometers to 1 μm, dispersed everywhere between and on the graphene sheets. The present process therefore allows for the preparation of a uniform and thin electrode layer having a good dispersion of the graphene and of the electrochemically active material. In comparison, the electrode made with the conventional method has a high agglomeration rate, as illustrated in FIG. 10, with large clusters composed of LiFePO$_4$/C particles.

As shown in FIG. 3, although no binder was used to prepare the LFPcelgard electrode, the cathode remained intact after cell cycling and its disassembly. FIG. 3c shows the electrode surface after cycling and washing with DMC. The film was flatter because of the pressure applied to seal the batteries before cycling but at higher magnification, as shown in FIG. 3d, the surface was very similar to that observed before assembly of the cell. Therefore, it appears that both the graphene and LiFePO$_4$/C particles remain connected together without dissolution of the electrode material layer, thereby providing good evidence that the use of a binder can be avoided in the manufacture of Li-ion batteries using the present method.

Figure 6:
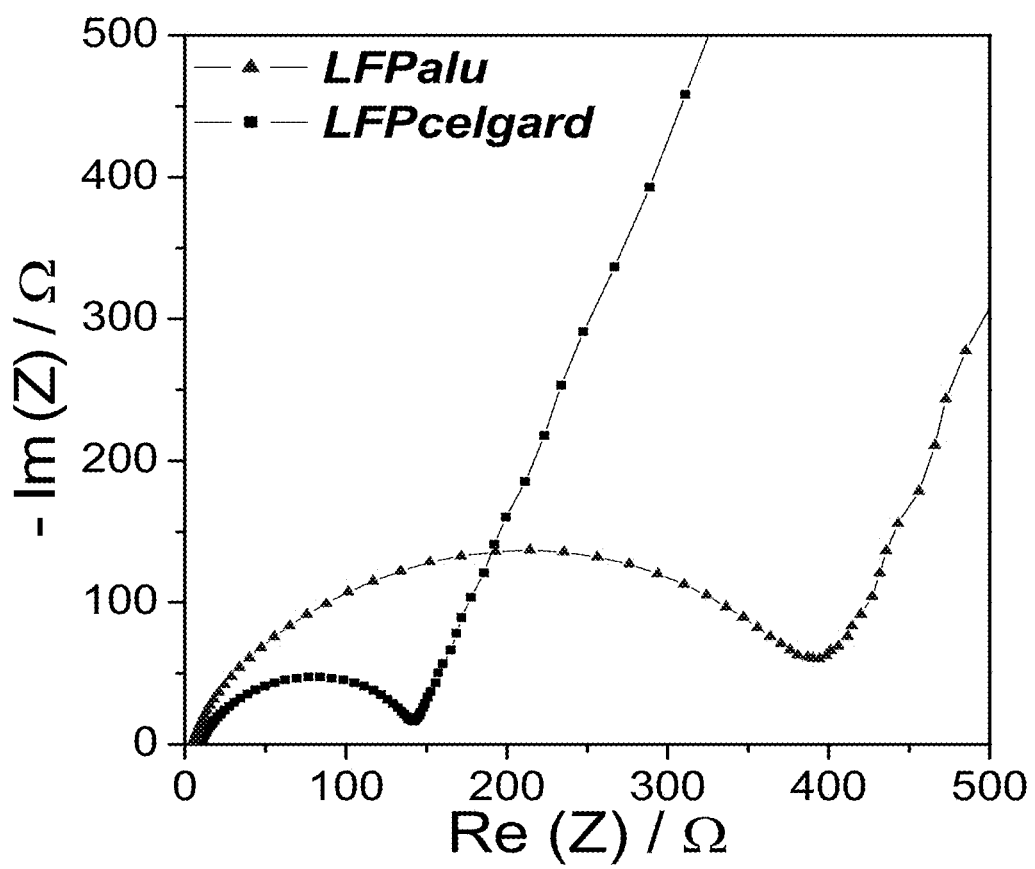
FIG. 6 shows electrochemical impedance spectroscopy measurements for an LFP electrode according to an embodiment compared to a conventional LFPalu electrode.
Figure 10:
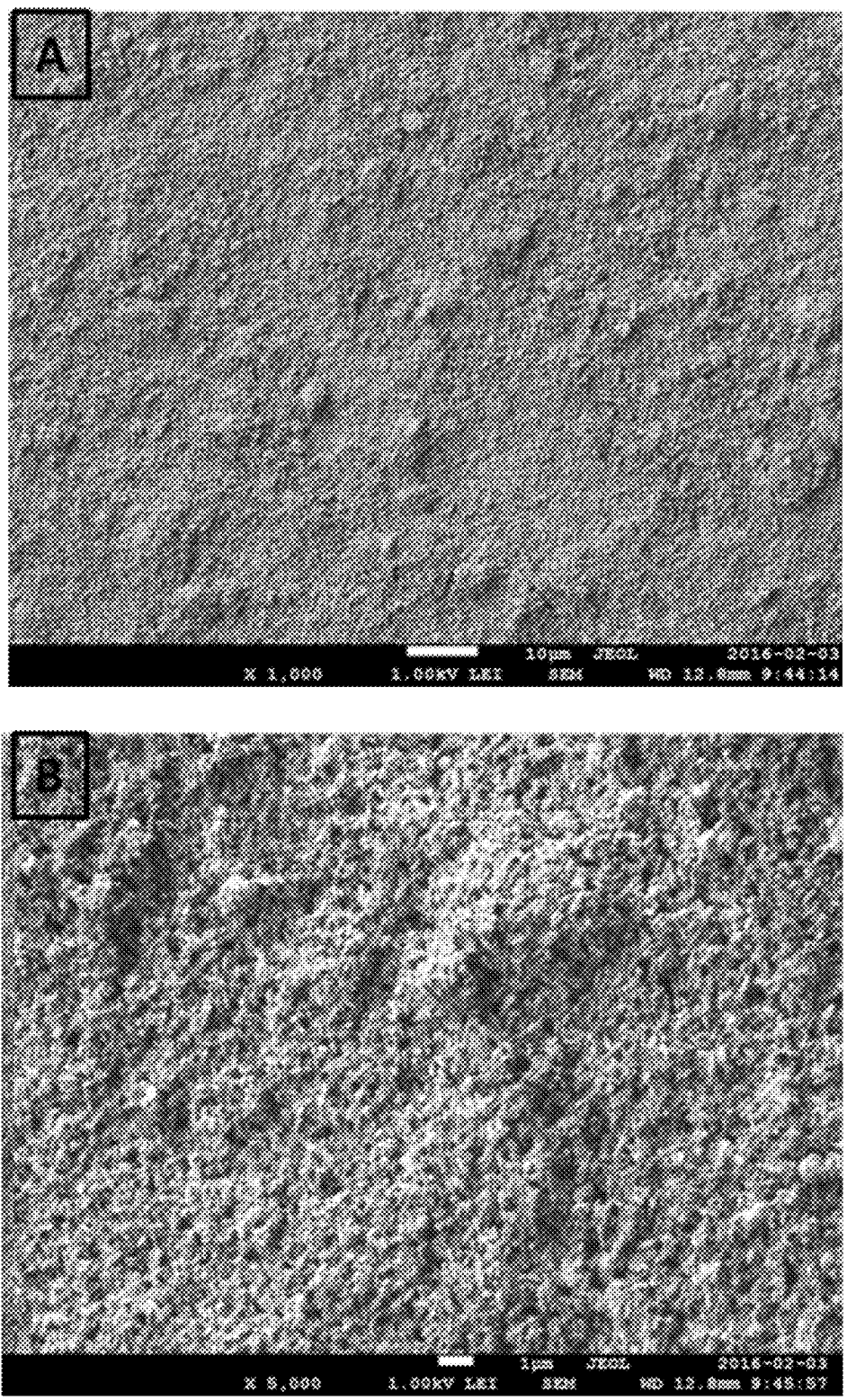
FIG. 10 shows SEM images of a conventional LFPalu electrode, obtained at a) 1000× and b) 5000×.

As mentioned above, the characterization of the LFPalu electrode by scanning electron microscopy reveals a high level of agglomeration, as shown in FIG. 10. At low magnification (FIG. 10a), several clusters of few micrometers randomly dispersed can be observed at the electrode surface. These clusters seem to be mainly composed of LiFePO$_4$/C agglomerates in contact with the binder. Such inhomogeneity of the cathode is one of the factors leading to poor electrochemical performance in comparison to the LFPcelgard electrode as explained below and as illustrated in FIGS. 4 and 6.

Example 3—Electrochemical Properties of LIFePO$_4$ Electrodes (a) Specific Charge/Discharge Capacities The electrochemical performances of the LFPcelgard and LFPalu electrodes were compared in half-cells.

The cells were monitored with a VMP3 potentiostat and the charge/discharge cycling procedure was performed in galvanostatic mode between 2.0 to 4.0 V versus Li/Li$^+$ at different current densities, after 1 hour at open circuit voltage (OCV). For each cycling rate ranging from C/10 to 5 C, 10 cycles were then subsequently recorded.

Figure 4:
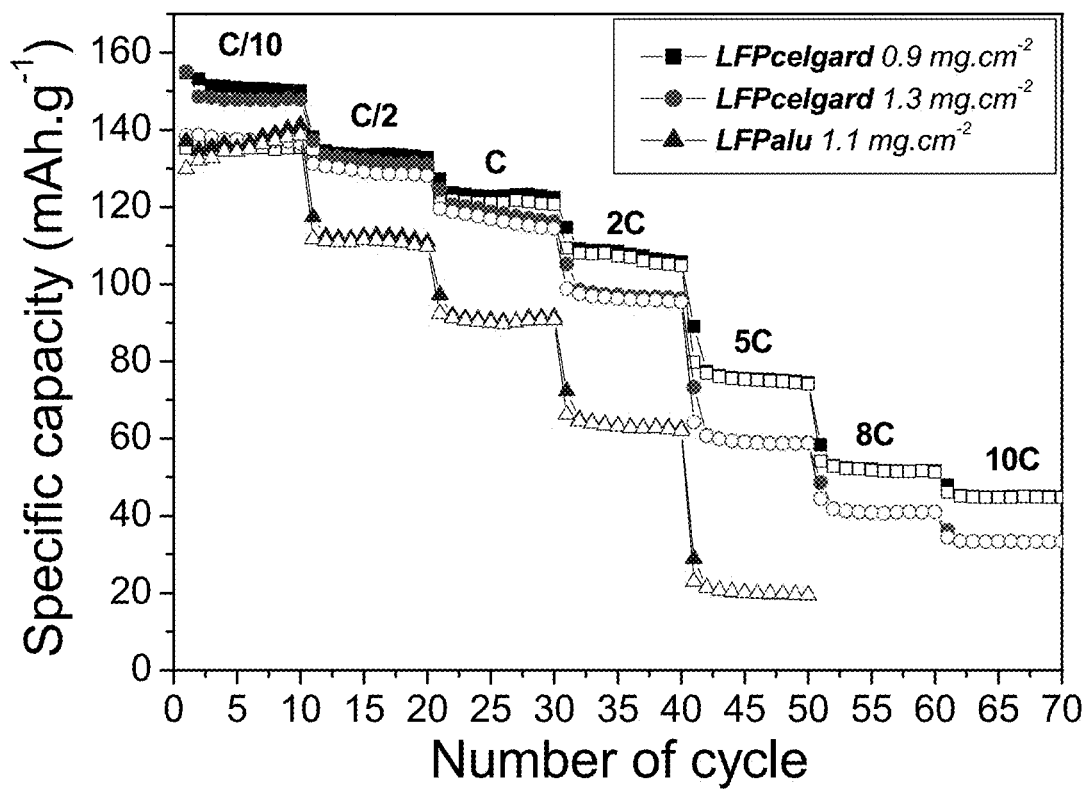
FIG. 4 shows the charge (full symbols) and discharge (empty symbols) specific capacities of LFP electrodes according to an embodiment (0.9 mg/cm$^2$ and 1.3 mg/cm$^2$); compared to an LFPalu (1.1 mg/cm$^2$) conventional electrode.

FIG. 4 presents the specific charge and discharge capacities for two LFPcelgard electrodes (0.9 mg/cm$^2$ and 1.3 mg/cm$^2$) as well as for an LFPalu electrode with an intermediate loading of material. At low current density (C/10), the discharge capacities for both types of electrodes were similar and were of about 140 mAh/g. At this cycling rate, the Coulombic efficiency for the LFPcelgard electrodes was lower than that of the LFPalu electrode. This may be due to the different type of carbon used in both types of electrodes. When the cycling rate was increased to C/2, the discharge capacity has remained stable for the LFPcelgard electrode with the lower loading (0.9 mg/cm$^2$), has slightly decreased for the higher loading LFPcelgard electrode, but drastically decreased to reach 110 mAh/g for the electrode manufactured according to the conventional method. A higher capacity was obtained for the LFPcelgard electrode (0.9 mg/cm$^2$) cycled at a 2 C rate. At a higher cycling rate of 5 C, only 15% of the initial discharge capacity was recovered with the LFPalu electrode. Higher capacity retentions were also obtained for the LFPcelgard electrodes when cycled at a rate of up to 10 C and with higher loading. Such an improvement was observed for electrodes produced using a nanostructured graphene encapsulated LiFePO$_4$ hybrid using a teflonized acetylene black binder (Praneetha et al., RSC Adv., 2013, 3, 25403-25409).

Figure 11:
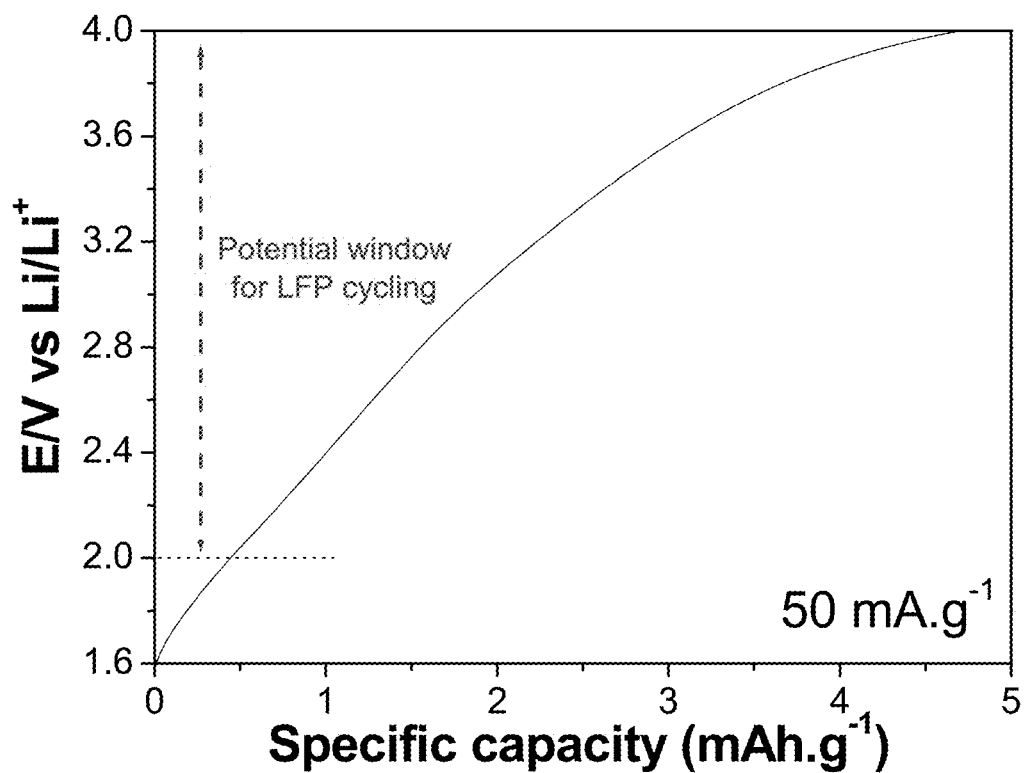
FIG. 11 shows the specific capacity obtained for a self-standing graphene electrode (electrode-separator element) according to one embodiment, cycled at 50 mA/g between the open circuit voltage (OCV) to 4 V v. Li/Li$^+$.

As illustrated in FIG. 11, the graphene, which represents at most 20% by weight of the electrode mass, did not significantly contribute to the specific capacities of the LFPcelgard electrodes. Indeed, a capacity of less than 5 mAh/g was obtained by cycling a self-standing graphene electrode in the same potential window, i.e., between 2 and 4 V v. Li/Li$^+$ (see FIG. 11). More specifically, FIG. 11 shows the first galvanostatic charge for a self-standing graphene electrode cycled at 50 mA/g between the open circuit voltage (OCV) and 4 V versus Li/Li$^+$.

Figure 5:
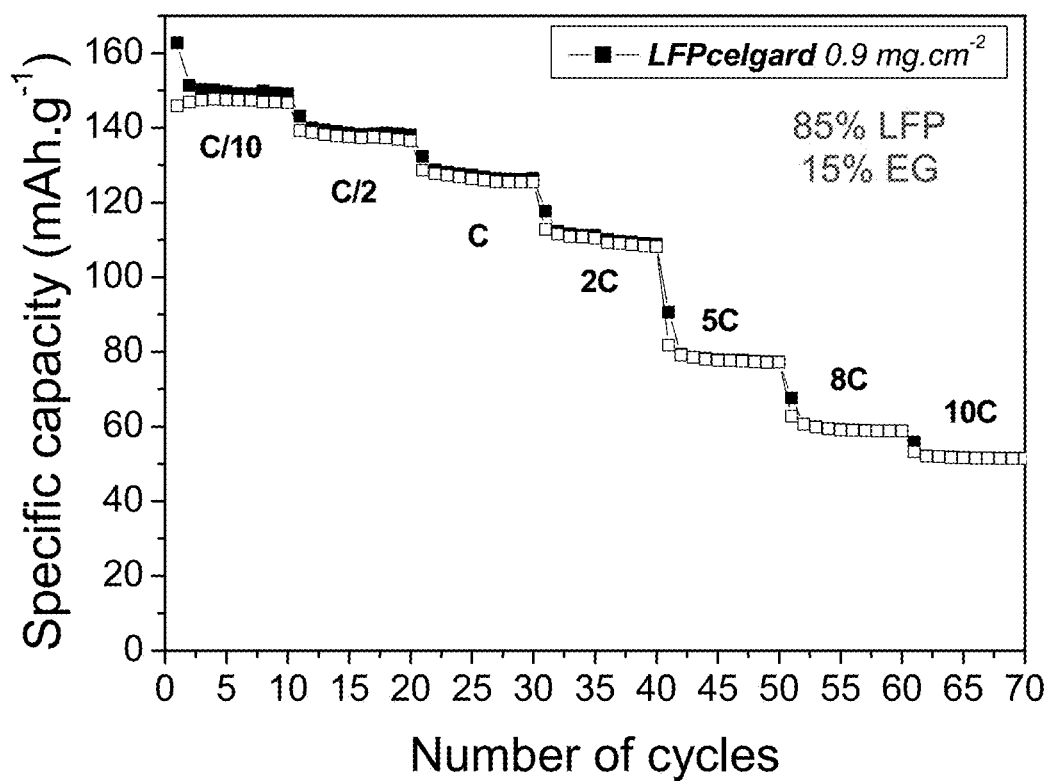
FIG. 5 shows the charge (full symbols) and discharge (empty symbols) specific capacities of an LFP electrode according to one embodiment (15 wt. % of graphene and 85 wt. % of LiFePO$_4$/C).

The charge and discharge specific capacities for a graphene-based electrode (LFPcelgard) containing 15 wt. % of graphene, based on the weight of the electrode, are shown in FIG. 5. The electrochemical performance for LFPcelgard electrodes containing 20 wt. % and 15 wt. % of graphene were similar, even at high cycling rate. This experiment demonstrates that the graphene loading can be reduced to 15% by weight. In addition, the mechanical resistance of the film was not significantly affected. A lower graphene content ($\leq$10 wt. %) shows a lower mechanical resistance for the films. These results demonstrate the possibility to easily manufacture composite electrodes without the use of a binder, and that present good electrochemical performances. SEM images suggest good electrical contact between the graphene and the LiFePO$_4$/C particles and the absence of large agglomerates of electrochemically active material, which leads to superior cycling performance, especially at higher cycling rate.

(b) Impedance and Conductivity

Electrochemical impedance spectroscopy measurements were performed for the LFPcelgard (20 wt. % of graphene) and LFPalu electrodes. The Nyquist plots presented in FIG. 6 show an intercept on the real axis at high frequency that is attributed to the resistance of the electrolyte. The values for this resistance were very similar since the same electrolyte was used in the same amount. A semicircle in the high-middle frequency region is observed for both the electrodes and the diameter on the Z axis is approximately equal to the charge-transfer resistance through the electrode/electrolyte interface (Delaporte et al., ACS Appl. Mater. Interfaces, 2015, 7, 18519-18529). These electrochemical impedance spectroscopy measurements were in agreement with the galvanostatic cycling performances presented in FIG. 4, since the charge-transfer resistance is higher (410Ω) for the LFPalu electrode compared to the LFPcelgard electrode (150Ω). The decrease in impedance for the LFPcelgard electrode was attributed to a better electrical contact between the LiFePO$_4$/C particles and the graphene sheets in the electrode material as well as to a more uniform distribution of the electrochemically active material in the composite electrode.

In fact, the electronic conductivity measurements reported in Table 1 below, show that it was one order of magnitude higher for the LFPcelgard electrodes than for the LFPalu electrode. In addition, the values for the two LFPcelgard electrodes were very similar with less than 9% variation. In contrast, for the LFPalu electrode, the conductivity variation was more important (25%). This behavior is probably due to the improved homogeneity of the electrode material layer formed on the Celgard® separator, the material being composed of a smaller number of agglomerates.

TABLE 1

Electronic conductivity values for the LFPcelgard and LFPalu electrodes.

| | Electrode | | |
|---|---|---|---|
| | LFPcelgard (0.9 mg/cm$^2$) | LFPcelgard (1.3 mg/cm$^2$) | LFPalu (1.1 mg/cm$^2$) |
| $\sigma_e$ (S/cm) | 2.31 ± 0.16 | 2.28 ± 0.20 | 0.24 ± 0.06 |

The conductivity of the LFPcelgard and LFPalu electrodes was determined by 4-point probe measurements using a DC precision current source (Keithley 6220™, Signatone). In order to avoid the contribution of the aluminum current collector, the inks used to prepare the LFPalu electrodes were casted on glass slides. For the LFPcelgard electrodes, the conductivities were measured directly on the electrode material layer formed on the Celgard® membrane. The DC current-voltage potential sweeps were recorded at 100 mV/s and yielded a linear response. The electrical conductivity of the cathode was calculated as follows:

$$\sigma_e = \frac{1}{R \times e}$$

where $\sigma_e$ is the electrical conductivity (S/cm), R is the film resistance determined from the inverse slope of the current-voltage (I-V) curve (Ω square) and e is the film thickness (cm).

Example 4—Electrochemical Properties of Li$_4$Ti$_5$O$_{12}$, Electrodes

The electrochemical performances of the LTOcelgard and LTOalu electrodes were compared in half-cells.

The cells were controlled with a VMP3 potentiostat and the charge/discharge cycling procedure was performed in galvanostatic mode between 1.2 and 1.9 V versus Li/Li$^+$ at different current densities, and that, after 1 hour at open circuit voltage (OCV). For each cycling rate ranging from C/10 to 5 C, 10 cycles were subsequently recorded.

Figure 7:
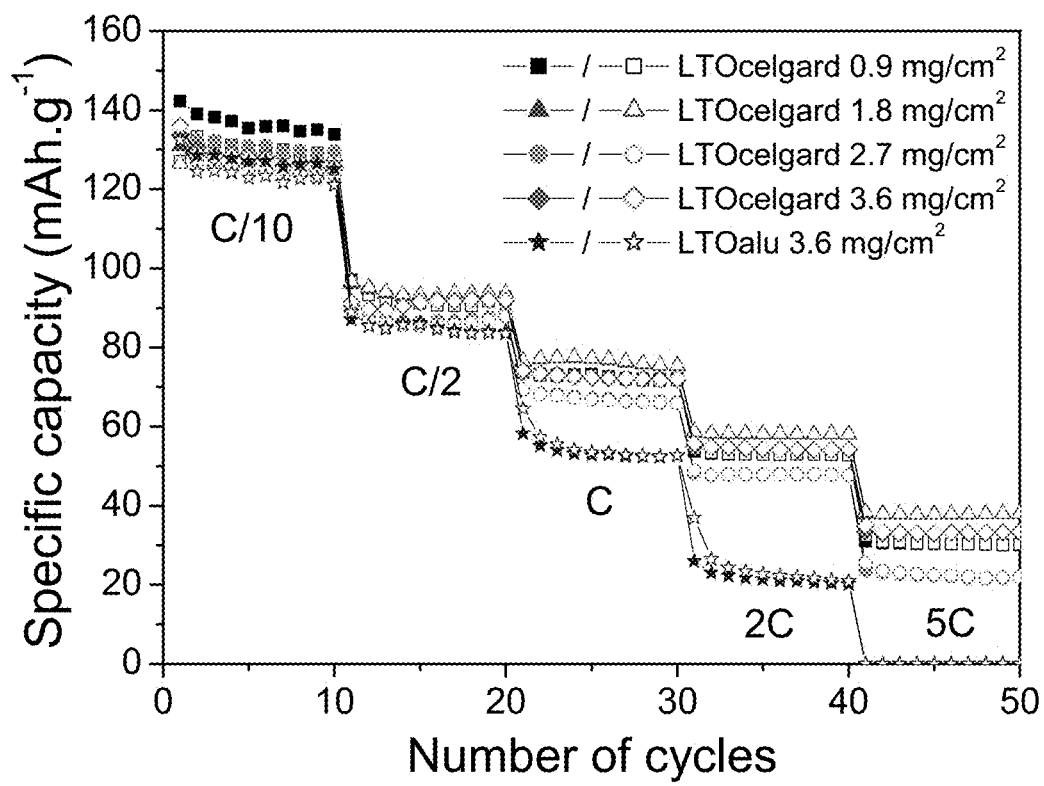
FIG. 7 shows the charge (full symbols) and discharge (empty symbols) specific capacities of LTOCelgard electrodes as defined herein (0.9 mg/cm$^2$ and 1.8 mg/cm$^2$, 2.7 mg/cm$^2$, 3.6 mg/cm$^2$); and a conventional LTOalu (3.6 mg/cm$^2$) electrode.

Uncoated LTO electrodes were prepared as described in Example 1 using a conventional method (LTOalu) and the present method (LTOcelgard). The specific charge and discharge capacities of these electrodes are presented in FIG. 7. Four LTOcelgard electrodes with loadings of 0.9, 1.8, 2.7 and 3.6 mg/cm$^2$ were tested. Similarly to what was observed above in FIG. 4 for the LFPcelgard and LFPalu electrodes, at low C-rate, similar specific capacities were obtained with both methods. However, an important capacity fading was observed when the electrode was cycled at a current of C/2. This is due to the low electronic conductivity of uncoated LTO (Doi et al.). At higher current densities, the electrochemical performance of the LTOcelgard electrodes was superior to that of the LTOalu electrode, as observed for LiFePO$_4$ electrodes (see FIGS. 4 and 6). The present method can therefore provide electrodes with high loading without affecting electrochemical performance. Indeed, as shown in FIG. 7, increasing the LTOcelgard electrode loading by a factor of 4 did not adversely affect the specific charge and discharge capacities.

Example 5—Electrochemical Properties of a LFPcelgard/LTOcelgard Battery

An LFPcelgard/LTOcelgard cell with an LFP/LTO weight ratio=1 was also tested between 1.0 and 2.5 V at different cycling rates ranging from C/10 to 5 C. Electrochemical impedance measurements were performed with an amplitude of 10 mV and a frequency range of 200 kHz to 0.01 Hz. Electrochemical impedance measurements were carried out after each five cycles of charge/discharge at a C/2 rate and after 4 hours at the OCV. All electrodes were cut into circular disks (area=1.767 cm$^2$) having a weight loading ranging from 0.9 to 3.6 mg/cm$^2$ depending on the material or the thicknesses of the electrodes.

The LFPcelgard and LTOcelgard electrodes were combined (with Celgard® surfaces facing each other) to prepare a complete Li-ion battery. The LTO anode was in the delithiated state and could theoretically insert 3 lithium ions. The reaction for the cell is given by equation 1 below:

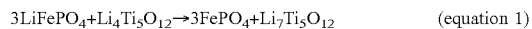

3LiFePO$_4$+Li$_4$Ti$_5$O$_{12}$→3FePO$_4$+Li$_7$Ti$_5$O$_{12}$     (equation 1)

Figure 8:
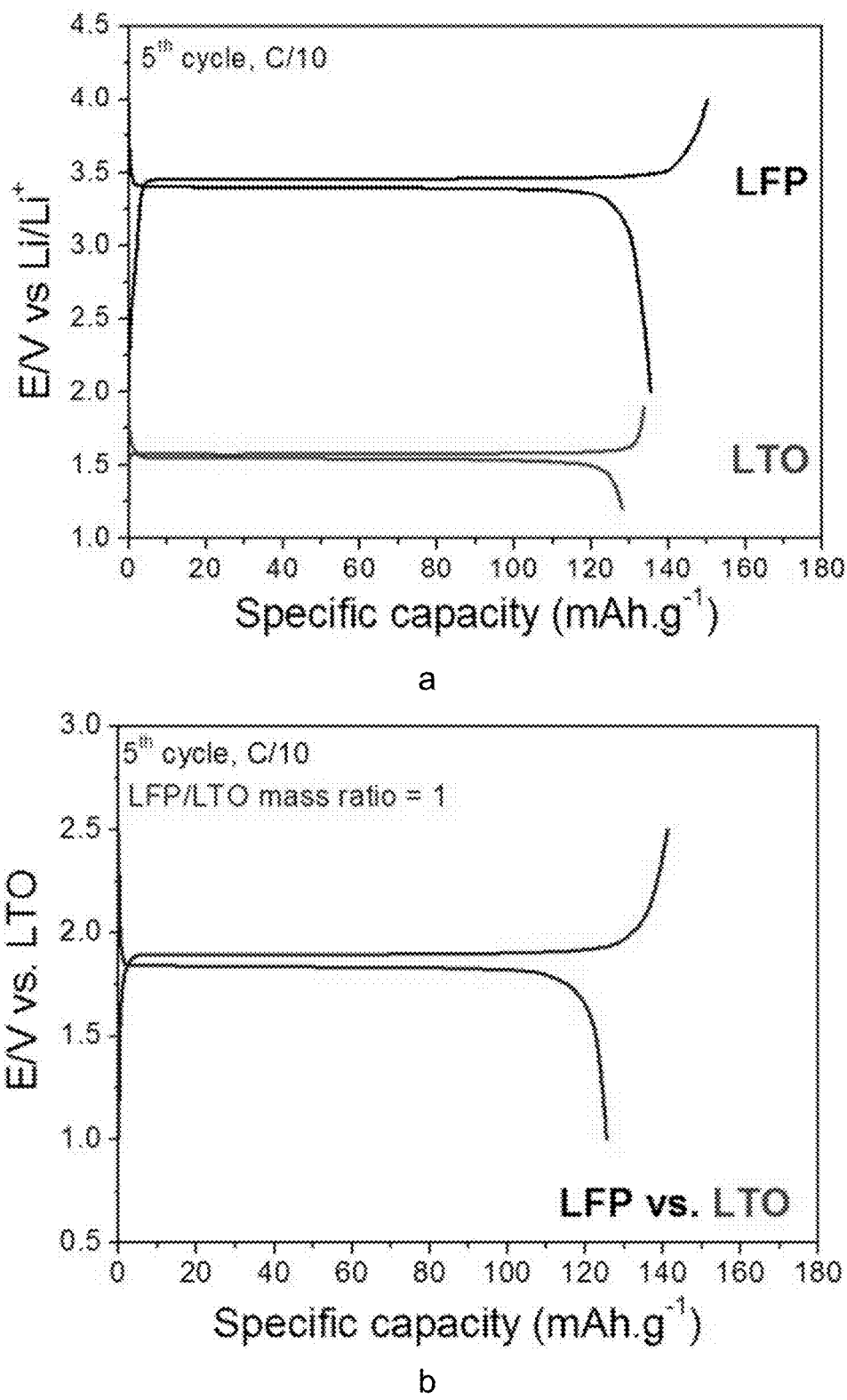
FIG. 8 shows charge and discharge profiles for the fifth cycle at a C-rate of C/10 for a) LiFePO$_4$/C (LFP) and Li$_4$Ti$_5$O$_{12}$ (LTO) electrodes according to an embodiment versus metallic Li, and for b) an LFP v. LTO complete battery with an LFP/LTO weight ratio=1, according to one embodiment.

Since the theoretical capacity (175 mAh/g) of an LTO electrode (Zaghib et al., *J. Power Sources*, 1999, 81-82, 300-305) is slightly higher than that of the LFP electrode (170 mAh/g), a LFP/LTO weight ratio close to 1 was used for the cell. FIG. 8a shows the charge/discharge profiles for the LFPcelgard and LTOcelgard electrodes in a half-cell and cycled versus metallic Li at C/10. The experimental specific capacity for both electrodes is lower than the theoretical capacity because of the various limitations of Li-ion cells and particularly in research-type cells such as coin or pouch cells. The LFP and LTO electrodes present a flat plateau due to the two phase reaction occurring at 3.4 and 1.55 V v. Li/Li$^+$, respectively (Colbow et al., *J. Power Sources*, 1989, 26, 397). FIG. 8b shows the typical charge/discharge plateau of 1.9 V for the complete LFPcelgard/LTOcelgard cell manufactured with the electrodes whose charge/discharge profiles are presented in FIG. 8a (Zaghib et al., *J. Power Sources*, 2014). The discharge capacity of 125 mAh/g is very similar to that of the LTOcelgard electrode, which seems to limit the capacity of the entire battery in this case.

Figure 9:
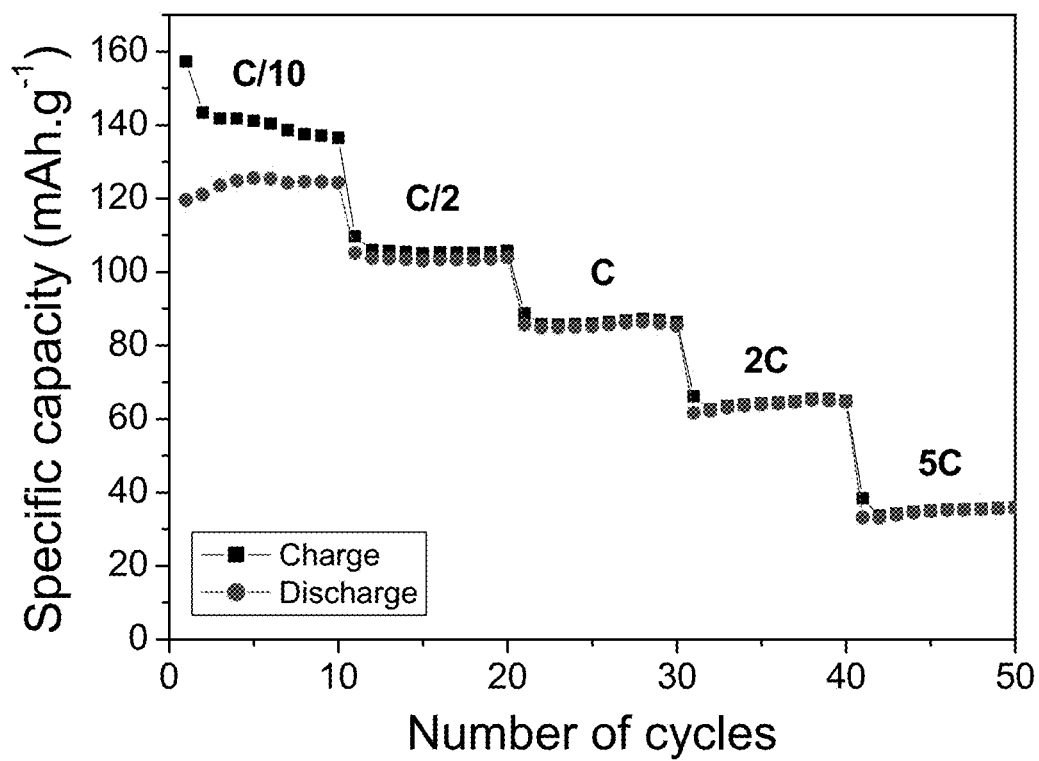
FIG. 9 shows the charge (full symbol) and discharge (empty symbols) specific capacities of an LFP v. LTO complete battery with an LFP/LTO mass ratio=1.

The charge and discharge specific capacities of the complete LFPcelgard/LTOcelgard battery are shown in FIG. 9. The specific capacities for each applied current were in the same range as that of the LTO electrodes presented in FIG. 7. Therefore, it appears that, in the present case, the electrochemical performances are limited by the LTO anode. For example, at 5 C the specific capacities for the LFPcelgard electrode (see FIG. 4) are approximately 80 mAh/g while only 40 mAh/g was reached for the LTOcelgard electrode (FIG. 7) or for the LFPcelgard/LTOcelgard battery (FIG. 9).

Generally, the process for producing flexible electrode-separator elements described herein demonstrates that graphene can be used as an additive and as binder in the manufacturing of Li-ion batteries. This process showed the possibility of avoiding the use of heavy and inactive aluminum foil current collector but also the use of binders and toxic solvents. The electrode film was formed directly on the battery separator. The electrodes are also flexible and show good mechanical resistance. Assembly of a cathode and an anode, both manufactured with the present technique, thus allows to make a flexible Li-ion battery. The comparison between the electrochemical performance of LiFePO$_4$/C and Li$_4$Ti$_5$O$_{12}$ electrodes of the present process and those prepared by conventional methods has shown that the absence of a binder and the use of conductive graphene resulted in improved performance. In addition, a iLiFePO$_4$/Li$_4$Ti$_5$O$_{12}$ battery where both the anode and the cathode are manufactured according to the present process has shown excellent stability during cycling.

In the present process, the steps of grinding and mixing of the components (conductive additive, binder, anode/cathode material) for the preparation of a suspension are replaced by a single step leading to a thin and homogeneous film formed directly on the battery separator (e.g., Celgard®). This process also allows for an increased energy density for the device since it avoids the use of an aluminum current collector, which normally represents by itself nearly 50% of the total weight of the electrode. The person skilled in the art will appreciate that with the ultra-thin self-standing graphene layer, a flexible metal grid or printed conducting film (Wu et al., Energy Storage Materials, 2015, 1, 119-126) may be used as current collector. No binder or current collector is needed, thus considerably reducing manufacturing costs of batteries. Moreover, the process is very quick and simple, which also results in lower costs. The toxic and costly NMP solvent is replaced with a less expensive solvent having a much lower drying temperature, such as DMF or an alcohol, and also water, resulting in a more environmentally friendly process.

Numerous modifications could be made to any one of the embodiments described above without departing from the scope of the present invention. Any patents, references, or scientific literature articles referred to in this document are incorporated herein by reference in their entirety for all purposes.

The invention claimed is:

1. A process for producing a flexible electrode-separator element comprising a self-standing electrode material comprising graphene, the electrode material being on a surface of a separator, wherein no current collector is required, the process comprising the steps of:

a) mixing a graphene powder and an electrochemically active material with a solvent to form a suspension;
b) applying the suspension obtained in a) on the separator to obtain an electrode material layer on the surface of the separator, wherein the electrode material layer comprises at least 10 wt % of graphene and is free of a binder; and
c) removing the solvent to obtain the flexible electrode-separator element, wherein steps (b) and (c) comprise steps of filtering the suspension obtained in (a) through the separator to obtain a layer of the electrode material on the surface of the separator, thereby obtaining the electrode-separator element.

2. The process of claim 1, wherein step (b) comprises a step of coating the suspension on the separator.

3. The process of claim 1, wherein the electrode material layer on the surface of the separator is dried after filtering.

4. The process of claim 1, wherein the graphene powder is obtained by exfoliation of a graphite foil.

5. The process of claim 1, wherein the electrochemically active material is selected from $TiO_2$, $Li_2TiO_3$, $Li_4Ti_5O_{12}$, $H_2Ti_5O_{11}$ and $H_2Ti_4O_9$, or a combination thereof, $LiM'PO_4$ wherein M' is Fe, Ni, Mn, Co, or a combination thereof, $LiV_3O_8$, $V_2O_5$, $LiMn_2O_4$, $LiM''O_2$, wherein M'' is Mn, Co, Ni, or a combination thereof, $Li(NiM''')O_2$, wherein M''' is Mn, Co, Al, Fe, Cr, Ti, or Zr, and combinations thereof.

6. The process of claim 1, wherein the electrochemically active material is a lithium titanate or a lithium metal phosphate.

7. The process of claim 6, wherein the electrochemically active material is $Li_4Ti_5O_{12}$, $LiFePO_4$, or carbon-coated $LiFePO_4$.

8. The process of claim 1, wherein the electrode material comprises between about 10 wt. % and about 30 wt. % of graphene.

9. The process of claim 1, wherein the electrode material comprises from about 15 wt. % to about 20 wt. % of graphene.

10. The process of claim 1, wherein the electrode material comprises about 20 wt. % of graphene.

11. The process of claim 1, wherein the solvent is N,N-dimethylformamide, water, an alcohol or a mixture thereof.

12. The process of claim 1, wherein the mixing step further comprises treating the suspension in an ultrasonic bath.

13. The process of claim 1, wherein the separator is a polymer separator.

14. The process of claim 13, wherein the polymer separator comprises at least one layer of polypropylene, polyethylene or a combination thereof.

15. The process of claim 14, wherein the polymer separator is a polypropylene/polyethylene/polypropylene trilayer separator.

16. The process of claim 1, wherein step (c) comprises a drying step, wherein said drying is carried out at a temperature of at least 50° C.

17. The process of claim 1, wherein step (c) comprises a drying step, wherein said drying is carried out at a temperature of at most 160° C.

18. The process of claim 16, wherein the temperature is within the range of from 50° C. to 80° C.

19. The process of claim 18, wherein the temperature is of about 60° C.

20. The process of claim 1, wherein step (c) comprises a drying step, wherein said drying is carried out under vacuum.

21. A flexible electrode-separator element produced by a process as defined in claim 1.

22. A flexible electrode-separator element comprising a self-standing electrode material comprising a graphene powder and an electrochemically active material on a separator, the electrode material being free of binder and comprising at least 10 wt % of graphene.

23. An electrochemical cell comprising a flexible electrode-separator element as defined in claim 21, a liquid or gel electrolyte, and a counter-electrode.

24. An electrochemical cell comprising an anode, a cathode and a liquid or gel electrolyte, wherein each of the anode and the cathode is a flexible electrode-separator element as defined in claim 21.

25. A system comprising the electrochemical cell of claim 23 in electrical or hybrid vehicles, or in information technology devices.

26. The process of claim 1, wherein no current collector is present.

* * * * *